Jan. 12, 1960
J. A. STEIN
2,921,157
FILTER GAUGE
Filed May 26, 1955
3 Sheets-Sheet 1
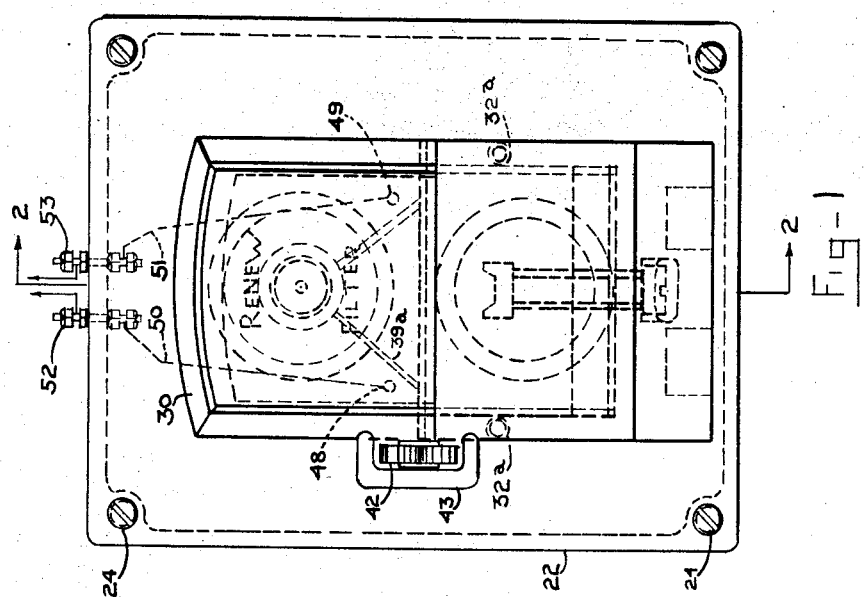
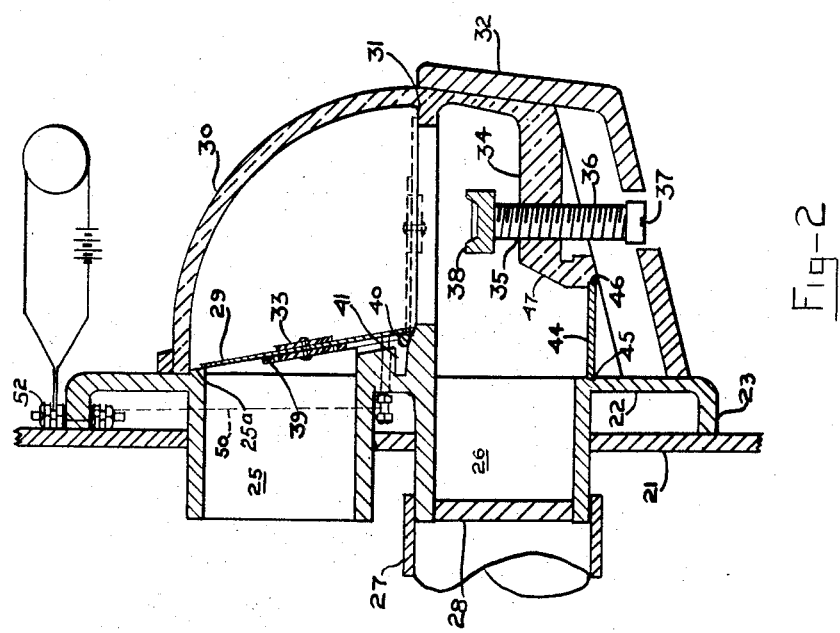
INVENTOR.
JOSEPH A. STEIN,
BY *[signature]*
HIS ATTORNEY.

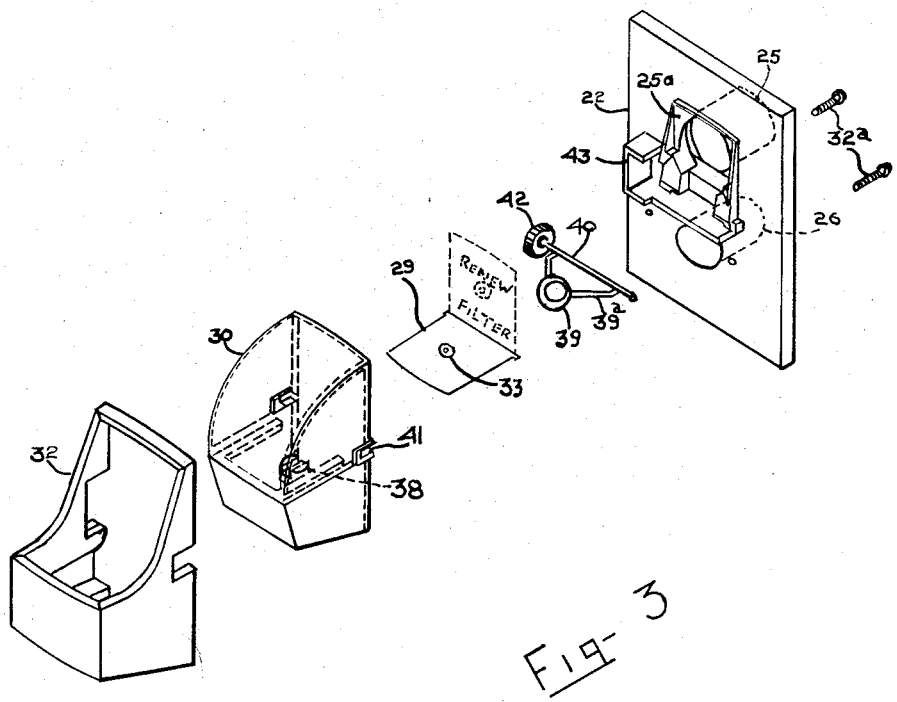

Jan. 12, 1960 J. A. STEIN 2,921,157
FILTER GAUGE

Filed May 26, 1955 3 Sheets-Sheet 3

INVENTOR.
JOSEPH A. STEIN,
BY *Joseph E. Chipman*
HIS ATTORNEY.

United States Patent Office 2,921,157
Patented Jan. 12, 1960

2,921,157

FILTER GAUGE

Joseph Arthur Stein, Pittsburgh, Pa., assignor to Bachrach Industrial Instrument Company, Pittsburgh, Pa., a corporation of Pennsylvania Application May 26, 1955, Serial No. 511,209

11 Claims. (Cl. 200—81.9)

This invention relates to a signaling device for indicating variances in pressures in gaseous flow systems, and while not necessarily so limited in its use, is intended more particularly for use as a signaling device for indicating when the filters in a hot or cold air heating or cooling system need to be cleaned or replaced, and which may be aptly referred to as a Filter Gauge.

Figure 4:
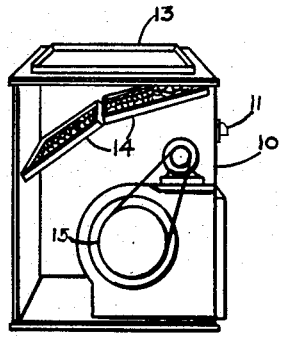

The novel features and advantages of the invention, as well as its various uses, will be readily apparent when the following detailed description is read in conjunction with the accompanying drawing, of which Figure 1 is a front elevation of a simple and proven embodiment of the invention; Figure 2 a vertical section taken on the line 2—2 of Figure 1; Figure 3 an exploded perspective view of the assembly incorporated in Figures 1 and 2; Figure 4 a perspective view of a forced air unit with one wall removed, showing the application of the invention, and Figure 5 a mid-sectional view of another embodiment of the invention.

Referring first to Figure 4, the numeral 10 designates the housing of a heating unit of the forced air type which is shown merely to illustrate one of the many applications to which a filter gauge embodying the applicant's invention can be put. In this illustration no attempt is made to disclose the well known details of a heating unit of this type, which in itself comprises no part of the invention. As schematically shown, the air intake opening of the unit is designated by the numeral 13, which 14 designates a conventional filter for removing air-borne particles from the air, and 15 a powered blower by means of which the air is drawn into the unit and circulated under forced flow into the circulating system not shown.

In any unit of this character due to the operation of the blower, there is a tendency, because of the presence of the filter, for a variation in pressure to develop on the opposite sides of the filter, and this variation will increase as the filter becomes more and more clogged up with captured foreign particles which it removes from the air. Furthermore, as is well known, such clogging up of the filter decreases its efficiency, as well as the efficiency of the system, and at a certain stage in its becoming fouled, it should be cleaned or replaced depending upon the type of filter being used. Also, as is well known, the pressure maintaining in the air stream on the side of the filter opposite the intake is lower than the pressure on the side at which the air enters the filter. With this knowledge, a filter gauge designed to react to pressure variances can be employed to indicate the condition of contamination of the filter. The numeral 11 designates one example of how a gauge constructed in accordance with this invention, as hereinafter described in detail, can be mounted on the heating unit.

With reference to the embodiment of the invention illustrated in Figures 1, 2, and 3, the reference character 21 designates the wall of the heating or cooling unit to which it is attached, and the numeral 22 what might be referred to as the supporting frame of the filter gauge. As best shown in Figure 2, in this embodiment this frame, which may be made of any suitable material, is made rectangular in shape, has a flange 23 about its periphery for spacing it away from the wall 21 to which it is attached, by screws 24 or other acceptable means. On the inner wall of the frame there are provided two spaced tubular projections 25 and 26. The purpose of these is to make connections thereby to either the pressure in the heating unit on both sides of the filter or only on the side of the filter next to the fan. When the gauge is mounted on the heater housing, connection may be made to the pressures on both sides of the filter by inserting the projection 25 in the fan chamber of the unit and by connecting one end of a hose or like conduit 27 at one end to the projection 26 and the other end (not shown) to the pressure on the intake side of the filter. Also the gauge can be employed using two such hoses or like conduits to effect these connections from points somewhat remote from the filter. When the gauge is installed for only exposure to the pressure on the fan side of the filter, a plug 28 is inserted in the tubular projection 26, or this tubular projection can be omitted, and no such opening provided in the frame 22.

At the outer face of the frame 22 it is provided with a tapered protrusion 25a which circumscribes the end of the tube 25 and forms a ported seat for a vane 29 when the latter is in its vertically disposed position. This protrusion is tapered outwardly from its top downwardly so that when the vane 29 is in the upper position, it can be retained in that position by gravity.

Opposite the outer end of the tube section 25 a cylinder housing 30 is provided. This housing 30, as shown best in Figs. 1 and 3, is mounted with its inner wall fitting snugly against the outer wall of the protrusion 28 on the frame 22 and forms at its interior a curved cylinder within which the vane 29 moves in the manner of a piston. For this reason the radial cross section of the interior of the cylinder housing 30 is just slightly greater, but of the same shape as the vane 29. Inside the cylinder housing 30 and at right angles to the wall of the tubular projection 25, the housing 30 is provided with a rib or ledge 31 which forms a lower ported seat for the vane 29.

The vane 29 is made of relatively weightless, non-magnetic material so that it can be moved from its lower to its upper seat by a minimum of pressure difference on its two sides. As shown, this vane is disposed to pivot about its end adjacent the frame 22 and to insure this, it can be either fitted in a slight offset at its inner end in the protrusion 28, or provided with trunnions which engage in suitable openings in the housing 30 just above the rib 31 adjacent the housing 22. In the center of the vane there is attached by a rivet or other suitable means a small piece of steel 33 or other suitable permeable material which functions somewhat as an armature.

Below the rib 31 in the housing 30 the housing 30 is extended downwardly and inwardly, having a portion 34 which is somewhat larger in cross section spaced below and parallel to the vane 29. In direct axial alignment with the armature piece 33 a thread opening 35 is provided in the parallel section 34 and in it there is fitted a threaded screw 36 having a slot 37 in its lower end to facilitate adjusting it and a permanent magnet 38 secured to its upper end directly below the armature 33.

The purpose of the armature 33 and the magnet 38 is to impose a selected magnetic force on the vane 29 whereby the user can selectively predetermine the variation in pressure on the two sides of the vane which must be present to cause the vane to move as a result thereof from its lower seat to its upper seat. In this way the user can readily determine, because such effects the variation of pressure at the two sides of the vane, just when the vane will be actuated with respect to the contaminated condition of the filter.

With such arrangement, whenever a sufficient pressure variance is applied to the vane to cause it to move from its lower toward its upper position and the vane starts to move, the magnetic pull diminishes and the vane snaps quickly to its upper position.

To utilize the vane 29 as a visual signal means, the housing 30 is made of a suitable clearly transparent plastic material and the vane itself is preferably made of a material which is bright and in color, or it is painted in such fashion so that the vane in its upper position will be both clearly visible and quite conspicuous. In addition, a sign such as "Renew Filter" may be advantageously applied to the bottom of the filter which will flash into view when the vane is in the filter renewal indicating position. As will be appreciated from the foregoing, once the vane 29 is in its upper position, it will remain there until it is manually reset, irrespective of whether the heating or cooling system to which it is attached is continued in operation or stopped, and even if reset, will immediately return to that position until the filter is cleaned or replaced. Another feature is that none of the moving parts of the gauge are exposed to any amount of dirt or influences which might interfere with their operation, since at no time is there any material flow of air through the gauge itself.

As shown best in detail in Fig. 3, a reset element 39 is provided for manually returning the vane 29 from its upper to its lower seat. While this element may take various shapes, as illustrated, it consists of a flat stamping somewhat in the shape of a yoke, the outer end of which is in the form of a ring connected by rigid links 39a to a shaft 40. The ends of this shaft 40 are arranged to fit in slots 41 in the cylinder housing 30 which permits the reset element to be readily rotated. At one end, the shaft 40 is provided with a knurled wheel 42 for manually actuating the reset element 39 and for the wheel's protection, a shield 43 is formed on the frame 22.

While, as stated above, a primary purpose of the reset element 39 is for manually returning the indicator vane 29 from its upper to its lower position, another purpose is to utilize it to assist in controlling or selecting the pressure variance which will bring about the actuation of the vane 29 from its lower to its upper seat. To this end the reset element is preferably made of permeable material and the ring portion is adapted when engaging the vane 29 to just fit around the armature 33 within the field of the magnet 38. Hence, when the vane 29 and the reset element 39 are positioned over the magnet 38, the pressure variation necessary to cause movement of vane 29 must be sufficient to overcome not only the weight of the vane, but also the magnetic force acting on both the armature 33 and the reset element. With this construction, by placing the reset element in its upper position and the vane 29 in its lower position, the magnet 38 can be adjusted so that the vane 29 will be just held down by the pull of the magnet when the filter in the air stream is perfectly clean and the reset element 39 so proportioned that when it is placed over the vane 29 in its lower position, it will just add the necessary additional magnetic force on the vane 29 to prevent the vane moving upward until the filter is fouled to the extent that it should be cleaned or replaced. As will also be apparent with such construction, the reset element 39 may be so proportioned that it will provide a considerably wider range of forces over which the movement of the vane 29 can be made responsive to variations in pressure by the adjustment of the magnet 38 than would be possible if only the armature 33 was utilized for this purpose. As will be also appreciated, the reset element may be made of non-magnetic material in which case only its weight will have any influence on the upward movement of the vane 29. For both holding the cylinder housing 30 in place, as well as protecting it and the adjusting screw 36, a shielding housing 32 is fitted over it, being held in place by suitable screws 32a, and vented in its bottom wall to accommodate the screw 36 and expose its interior to atmospheric pressure.

As shown best in Fig. 2, a closure plate 44 is provided in the air chamber below the lower seat for the vane 29, being removably fitted in slots 45 and 46 respectively in the frame 22 and an extension 47 of the portion 34 of the housing 30, in which the screw 36 for adjusting the magnet 38 is mounted. This plate is located below the tubular projection 26 whereby when used, it forms an air-tight chamber below the vane 29 when the tubular projection 26 is connected by a tube such as the tube 27 to the intake side of the filter. On the other hand, when the plug 28 is inserted in the tubular projection 26 or this opening in the frame 22 is omitted, this closure plate 44 is removed so that under such mode of operation the underside of the vane 29 is exposed to atmospheric pressure whereby movement of the vane 29 is dependent upon the difference in pressure in the fan chamber and the atmospheric pressure.

In many applications where the gauge may be used, it is desirable to provide for indicating the condition of the filter in the air circuit at a point or points somewhat remote from the point where the gauge itself is located. While this may be accomplished in various ways and by various means, a simple way for doing so is illustrated which comprises placing two spaced electrodes 48 and 49 in the frame 22 with their outer ends so located that the vane 29 will bridge them and complete an electric circuit between them when the vane 29 is in its upper position. This can be also accomplished by using the reset element 39 for such purpose when the latter is in its upper position. If the vane 29 is used for such purpose and the vane is made of non-metallic material, it can have a conductor strip not shown attached to it to function as such a bridge. The inner ends of these electrodes are threaded and equipped with nuts by means of which conductors 50 and 51 are connected to a pair of terminals 52 and 53 provided in the frame 22 at the top of the tubular projection 25 on the outer face of the frame 22. These in turn are connected in a signal circuit such as illustrated which may include a signal light, a buzzer or other electrically operated signal device. As will be apparent to those skilled in the art, the portion of the circuit in the gauge itself may be either merely a pilot circuit or an actual part of the remote signal working circuit.

Figure 5:
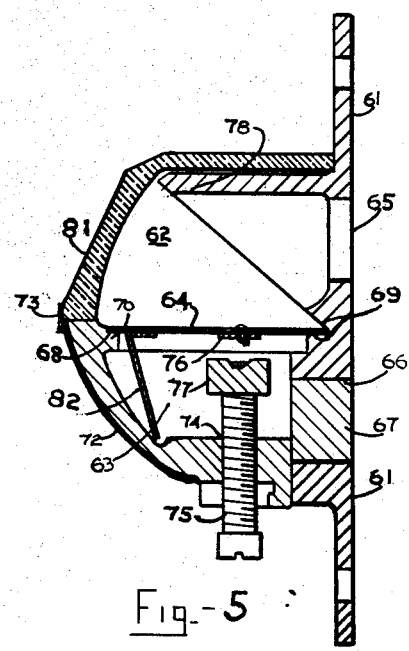

With reference to the modification of the invention shown in Fig. 5, the refernce numeral 61 designates the supporting frame for the gauge which is designed to fit flush against the side wall of the unit to which it is to be attached. In this modification for connecting the working cylinder 62 and the air chamber 63 below the indicating vane 64 with the pressure on the two sides of a filter, the frame is provided with two openings 65 and 66. As in the previously described embodiment, if it is desired to close off the lower opening 66, a removable plug 67 is provided as shown, or this part of the frame may be made without any such openings.

A lower seat 68 for the indicating vane 64 is provided by a projection 69 formed on the outer face of the frame 61. This seat is completed by an inwardly and matching ledge 70 which is formed on a housing section 72 that is fitted against the frame 61 and held in place by an encircling band 73 that is attached by screws or other suitable means not shown to the frame 61. In the lower portion of this housing section 72 a threaded bore 74 is provided in which an adjusting screw 75 is positioned in axial alignment, as in the previously described embodiment, with the armature 76 on the vane 64, and the screw has on its upper end a permanent magnet 77.

As shown in Fig. 5, a projection 78 is provided on the outer face of the frame which forms the upper seat for the vane 64, but in this case this seat tapers inwardly toward the frame 61 from the upper end of the projection downwardly. Hence, in such embodiment the vane 64 is held on its upper seat by the air pressure alone and moves to its lower seat by the action of gravity. The cylinder housing 81 in this embodiment like in the previous embodiment is made of clearly transparent material to permit visual observation of the indicating vane 64, but extends only downward into engagement with the housing section 72 and like the latter is held in place when assembled by the retaining band 73. While not illustrated in the drawing, the housing 72 is provided with knockout openings which are taken out when the plug 67 is used, or if no opening 66 is formed in the frame 61, cutouts are made in the housing section 72 to expose the chamber below the indicating vane 64 to atmospheric pressure.

As shown in Fig. 5, the indicating vane 64 includes in addition to the construction of the vane 29 shown in Figs. 1, 2 and 3 a downwardly extending projection 82 which appears in front of the window of the housing 81 when the vane is in its upper position and which preferably carries a legend indicating the filter should be renewed, the same as explained above. With this construction the vane 64 as shown is disposed to pivot about the root of the groove in the frame 61 formed by the inclined projection 78, and by reason of such construction no reset element is required.

If desired in this construction, the upper seat for the vane 64 may be shaped so that the vane will project at its edges beyond the outer edges of this seat when the vane is on or near its upper seating position. Hence, due to the action of the high pressure air on both sides of the outer edge of the vane and because of the difference in areas of the vane exposed to the two pressures, the vane will be caused to flutter and produce a chattering sound which may be utilized as a signal to indicate when the filter should be changed. When the filter is changed, the vane will, of course, return to its non-signaling position.

In the forms of the device which have been here illustrated, the seats constitute abutments which limit the movement of the vane, and these seats are in planes which intersect with the pivoting axis of the vane parallel with and substantially at the line where the two planes intersect. The vane has a working fit in the transparent housing so that it responds to the difference in pressure created on the opposite faces through the ports in the respective seats, but there is little clearance for the free flow of air around the vane when it is moving from one position to the other so that the effect of the differential pressure cannot be dissipated around the edges of the vane as soon as the vane unseats and there is very little actual movement of air through the device.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A signaling device of the class described comprising a body having two ported abutments therein disposed in planes which intersect, a vane pivotally supported in the housing with its pivoting axis at the line of intersection of the two planes and movable from a position over the port in one abutment to a position over the port in the other, a transparent enclosure in the body enclosing the arcuate space through which the vane moves from a position over one port to the other and through which the vane is visible, said vane being movable in response to a force differential upon opposite faces of the vane established through the ports.

2. A signaling device as defined in claim 1 wherein the vane has a signaling face which is exposed to view when the vane is over one port and which is concealed when the vane is over the other port, the vane being biased to remain over the port against which the signaling face is concealed until a predetermined force increase upon the non-concealed face is established.

3. A signaling device as defined in claim 2 wherein the area of the ports in each of said abutments is less than the area of the vane and the said enclosure provides only a working clearance around the vane, whereby when the vane is initially moving from the port against which it is biased the force increase is effective over a greater area of the vane than is the bearing force to accelerate movement of the vane towards the other abutment.

4. A signaling device as defined in claim 2 wherein there is a reset element pivoted in the body having an operating terminal accessible outside the body for moving the vane from the position where the signaling face of the vane is exposed to the position over the port where the signaling face is concealed.

5. A signaling device as defined in claim 2 wherein the biasing means comprises a permanent magnet mounted in the body adjacent the concealed face of the vane when it is in the position to conceal the signaling face, at least parts of the vane assembly being of magnetic material to be attracted by the field of the magnet.

6. A signaling device of the class described comprising a body having two ported abutments therein disposed in planes which intersect, a vane pivotally supported in the housing with its pivoting axis parallel with and substantially coinciding with the line of intersection of the two planes of the abutments and movable through an arc from a position over one port to a position over the other, a transparent enclosure on the body enclosing the arcuate space through which the vane moves and through which the vane is visible, said vane being movable in response to a pressure differential on opposite faces thereof established through the ports, one face of the vane being a signaling face which is exposed to view when the vane is over one port and which is concealed when the vane is over the other port, a reset element pivoted in the body having an operating terminal accessible outside the body for moving the vane from the position where the signaling face of the vane is exposed to one where it is concealed, a magnet in the body adjacent that abutment against which the vane is seated when the signaling face is concealed, the reset comprising a magnetizable body against the face of the vane opposite the signaling face positioned to be attracted by the magnet to exert a biasing force on the vane.

7. A signaling device as defined in claim 2 in which there is an electric contact element in the body engaged by the vane when it is over the port where the signaling face is exposed.

8. A signaling device for use in a forced air circulating system for indicating when the air filter in such system should be cleaned or replaced, which comprises in combination a hollow housing having therein an air chamber of uniform cross section, a vane arranged for movement in said chamber, a seat for engaging said vane at each end of said chamber, means for engaging said vane at each end of said chamber, means for connecting one end of said chamber to the air pressure in the air circulating system on the low pressure side of the filter, means for exposing the opposite side of said vane to either the atmosphere or the air pressure in the circulating system on the high side of the pressure filter, magnetic means for applying a magnetic force to said vane when it is seated on the seat in said chamber next to the high pressure inlet to the chamber, the said hollow housing being formed to provide an air chamber which is arcuate in shape, the vane being mounted for pivotal movement about one of its lateral edges, the two seats being disposed at an obtuse angle, one of which is horizontal and the other of which is inclined away from a vertical position, and a reset element for manually returning the vane to a position where the vane is against that seat which is horizontal from a position where it is against the other seat.

9. A signaling device as defined in claim 8 in which the reset element is made of permeable material and is operative to influence the magnetic force on the vane when the latter is within the field of influence of the magnetic field for applying a magnetic force on the vane.

10. A signal device for use in the blower cabinet of an air distributing system which includes a filter, said signal device comprising a casing having an outlet opening on one side exposed to suction pressure of air which has passed through the filter, said casing having an inlet opening at the opposite side exposed to substantially atmospheric pressure, a vane member movably mounted in said casing and carrying a visible signal to be exposed when the vane member is actuated, said vane member normally closing said inlet opening, a predetermined pressure on said vane member moving it from inlet closing to inlet opening position when the filter has become sufficiently clogged to produce a differential of pressure between the inlet and outlet opening of said casing, which indicates substantial impairment of the efficiency of the filter by partial clogging of the filter, said vane member including a movable armature and a permanent magnet mounted in said casing and located for said armature to come into proximity of the field of the permanent magnet when the vane is in inlet closing position, the pressure thrust on said vane member overcoming the pull of the permanent magnet at a predetermined value and releasing said armature to permit said vane to open with a snap action for positive opening.

11. A signaling device as defined in claim 5 wherein the permanent magnet is adjustably mounted in said body for movement towards and away from the vane, a reset element pivoted within the body to overlie said vane when the latter is within the field of the magnet, an operating terminal on said reset element and accessible outside the body for moving the reset element into and out of engagement with the vane and for returning the vane from the position where the signal face of the vane is exposed to the position where the vane is biased by the magnet, the reset element having a magnetizable body adding a biasing force to the vane when positioned over the vane and within the field of the magnet.

References Cited in the file of this patent

UNITED STATES PATENTS

| | | |
|---|---|---|
| 1,090,669 | Woodington et al. | Mar. 17, 1914 |
| 2,214,092 | Uhlhorn | Sept. 10, 1940 |
| 2,348,950 | Anderson | May 16, 1944 |
| 2,475,850 | Moore et al. | July 12, 1949 |
| 2,523,967 | Nystul | Sept. 26, 1950 |
| 2,669,707 | Ehrman | Feb. 16, 1954 |
| 2,700,362 | Calling | Jan. 25, 1955 |
| 2,789,175 | Mahr | Apr. 16, 1957 |